United States Patent [19]

Jeon

[11] Patent Number: 5,732,922
[45] Date of Patent: Mar. 31, 1998

[54] MONITOR SUPPORT

[75] Inventor: Chang Wook Jeon, Kyungsangbuk-Do, Rep. of Korea

[73] Assignee: LG Electronics Inc., Seoul, Rep. of Korea

[21] Appl. No.: 585,536

[22] Filed: Jan. 16, 1996

[30] Foreign Application Priority Data

Jan. 16, 1995 [KR] Rep. of Korea .................. U95-00562

[51] Int. Cl.$^6$ ............................................. A47G 29/00
[52] U.S. Cl. .......................... 248/371; 248/923; 248/921; 248/349.1; 248/181
[58] Field of Search ....................... 248/371, 398, 248/349.1, 918, 922, 921, 923

[56] References Cited

U.S. PATENT DOCUMENTS

| | | | |
|---|---|---|---|
| 3,486,629 | 12/1969 | Slaga | 248/349.1 |
| 4,483,503 | 11/1984 | Gahan | 248/349.1 |
| 4,525,746 | 6/1985 | Mangold et al. | 358/254 |
| 4,533,105 | 8/1985 | Cornwall, Jr. et al. | 248/371 |
| 4,554,590 | 11/1985 | Chelin et al. | 248/921 |
| 4,562,988 | 1/1986 | Bungardner | 248/349.1 |
| 4,564,166 | 1/1986 | Craft et al. | 248/921 |
| 5,102,081 | 4/1992 | Barchus | 248/371 |
| 5,102,082 | 4/1992 | Bang | 248/921 |
| 5,145,134 | 9/1992 | Hashimoto et al. | 248/371 |
| 5,209,446 | 5/1993 | Kawai | 248/371 |
| 5,398,903 | 3/1995 | Cho | 248/371 |
| 5,518,216 | 5/1996 | Wu | 248/371 |
| 5,588,625 | 12/1996 | Beak | 248/371 |

FOREIGN PATENT DOCUMENTS

| | | |
|---|---|---|
| 06018423 | 2/1994 | Japan . |
| 9501077 | 1/1995 | WIPO . |

*Primary Examiner*—Ramon O. Ramirez
*Assistant Examiner*—Kimberly T. Wood
*Attorney, Agent, or Firm*—Oppenheimer Wolff & Donnelly

[57] ABSTRACT

A monitor support comprising a monitor supporting part which contains speakers and supports the monitor. The monitor support comprises a base; a monitor supporting part coupled on the base to be rotatable, a side of the monitor supporting part formed base and the monitor supporting part so that the monitor supporting part can be rotated; and a shield for sealing the upper portion of the monitor. Therefore, the howling phenomena in the monitor is prevented since the sound pressures generated from the speakers are prevented from being transferred to the cathode-ray tube of monitor.

2 Claims, 3 Drawing Sheets 5,732,922

MONITOR SUPPORT

BACKGROUND OF THE INVENTION

1. Field of the Invention

The present invention relates to a monitor support, in particular relates to a monitor support comprising a monitor supporting part which contains speakers and supports the monitor body to be rotatable in an upward, downward, left or right direction as a user desires.

2. Description of the Prior Art

Recently, various multimedia software programs are being rapidly developed and thus processing of sound signals together with video signals has become a matter of great importance. In connection with monitors, however, attention has not been seriously paid to the installation of speakers for the output of sound until recently. As a result, speakers have been typically used separately, located around a monitor body, or attached to the monitor body.

FIG. 1 is a vertical section view illustrating a prior art monitor support, in which speakers are fixed to the monitor body. With reference to FIG. 1, the monitor support comprises a base 1; a boss 1A upwardly projected from the base 1; a monitor supporting part 2 connected on the upper surface of the base 1, the part 2 supporting the monitor body 5 to be rotatable in upward, downward, left and right directions; a hole 2A formed within the monitor supporting part 2 to receive the boss 1A; a connector 3 for connecting and supporting the monitor supporting part to be rotatable about the boss 1A; and screw 4 inserted into the boss 1A formed on the upper surface of the base 1 and tying the base 1, the monitor supporting part 2 and the connector 3.

The reference numeral 6 indicates a speaker fixed to the front portion of the monitor body 5 and the reference numeral 7 indicates a screw for fixing the speaker.

The prior art monitor support constructed as explained in the above is assembled in the following manner.

At first, the monitor supporting part 2 is positioned on the base in such a manner that the boss 1A projected from the upper surface of the base 1 can be inserted into the hole 2A formed in the lower portion of the monitor supporting part 2.

Thereafter, the connector 3 is located on the inner surface of the monitor supporting part, the screw 4 is inserted into the boss 1A to connect the base 1, the monitor supporting part 2 and the connector 3 and then the monitor body 5 is coupled to the upper side of the monitor supporting part 2.

The monitor support assembled as explained in the above can be rotated in left and right directions within a predetermined range and can be tilted up and down within a predetermined range due to the shapes of the boss 1A and hole 2A of the monitor supporting part. In other words, a user can freely set a position of the monitor body 5 in a desired position by moving the monitor body 5 in upward, downward, left and right directions, since the hole 2A formed in the monitor supporting part 2 permits moving of the boss 1A.

When a user wishes to connect the speakers to the monitor to use them with the monitor, it is possible to the speakers by directly fixing them to the lower portion of the front internal side of the monitor body using screws 7.

However, if the speaker 6 is installed within the monitor body 5 in the above manner, sound pressures generated from the speaker 6 will be directly transferred to the cathode-ray tube and exert a force on the shadow mask of the cathode-ray tube. As a result, the howling phenomena, i.e., the trembling phenomena of the monitor images, will be produced since electronic beams projected from an electron gun mounted within the monitor cannot be suitably focused onto the shadow mask.

SUMMARY OF THE INVENTION

It is an object of the invention to solve the above problems, in particular to provide a monitor support which comprises a monitor supporting part containing speakers and supporting the monitor body to be rotatable in upward, downward, left and right directions as a user desires, the monitor supporting part being able to absorb the sound pressures generated from speakers, thereby preventing the howling phenomena of the monitor caused by the sound pressures of speakers.

In order to achieve the above object, the present invention provides a monitor support comprising a base; a monitor supporting part connected on the base to be rotatable in upward, downward, left and right directions, a side of the monitor supporting part being formed with a plurality of speaker fixing portions; a connector for connecting the base and the monitor supporting part so that the monitor supporting part can be rotated; and a shield for sealing the upper portion of the monitor supporting part.

Preferably, the monitor supporting part comprises a lower slip surface formed on the lower surface of the monitor supporting part to be contacted with a slip surface formed in the base when the supporting part is connected to the base; a upper slip surface formed at a predetermined height from the lower slip surface and contacted with the top surface of a conical projection formed on the base; a slip hole formed at the center of the upper slip surface, so that a boss projected from the base can be inserted through the slip hole; a plurality of shield fixing bosses formed internally of the peripheral surfaces of the monitor supporting part; and a plurality of monitor fixing lugs extended from the upper external surface of monitor supporting part.

BRIEF DESCRIPTION OF THE DRAWINGS

The above objects, the other features and advantages of the present invention will become more clear through the following detailed description of a preferred embodiment of the present invention with reference to the attached drawings in which.

DETAILED DESCRIPTION OF THE PREFERRED EMBODIMENT

Figure 1:
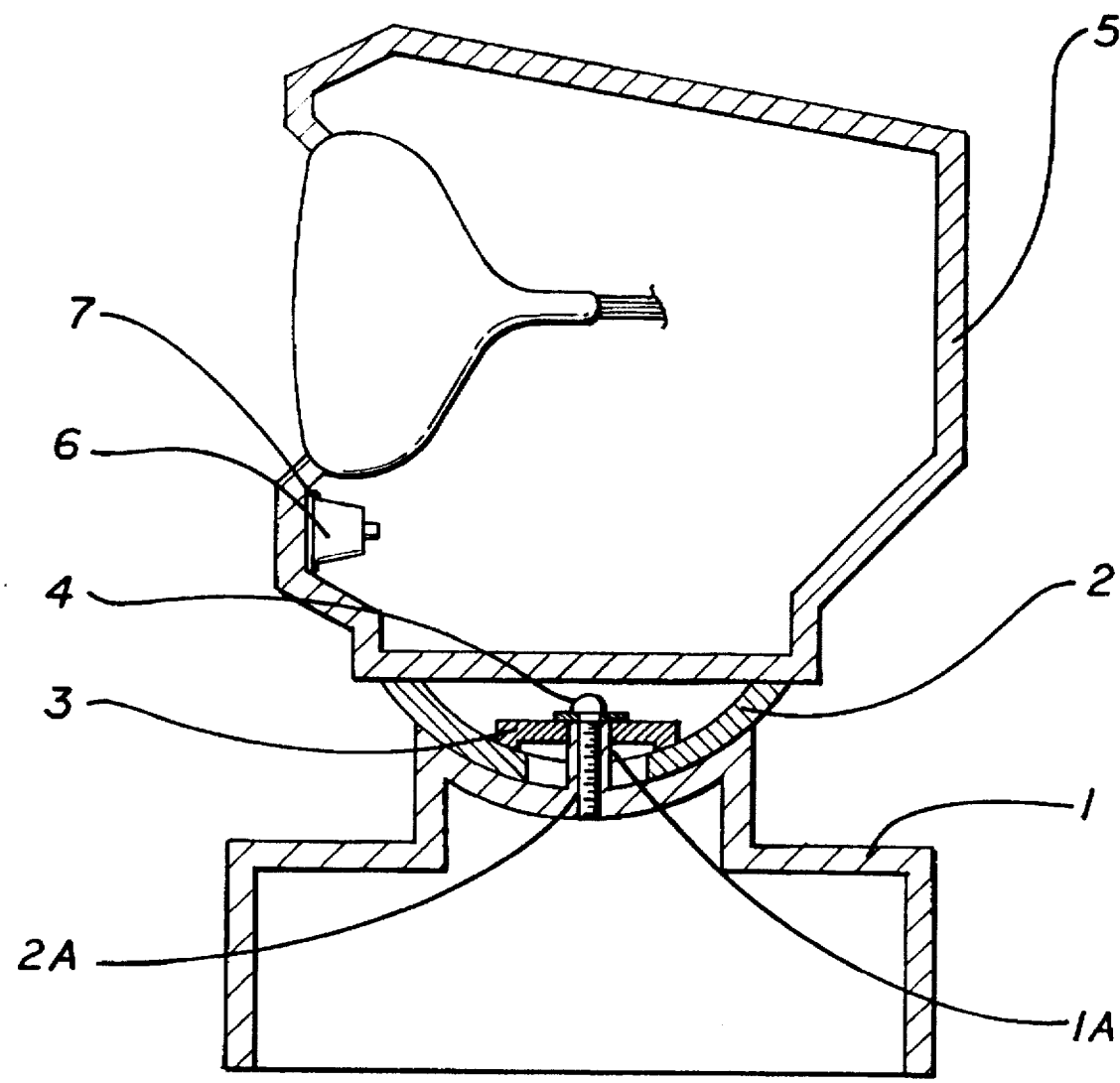
FIG. 1 is a vertical section view illustrating a prior art monitor support.
Figure 2:
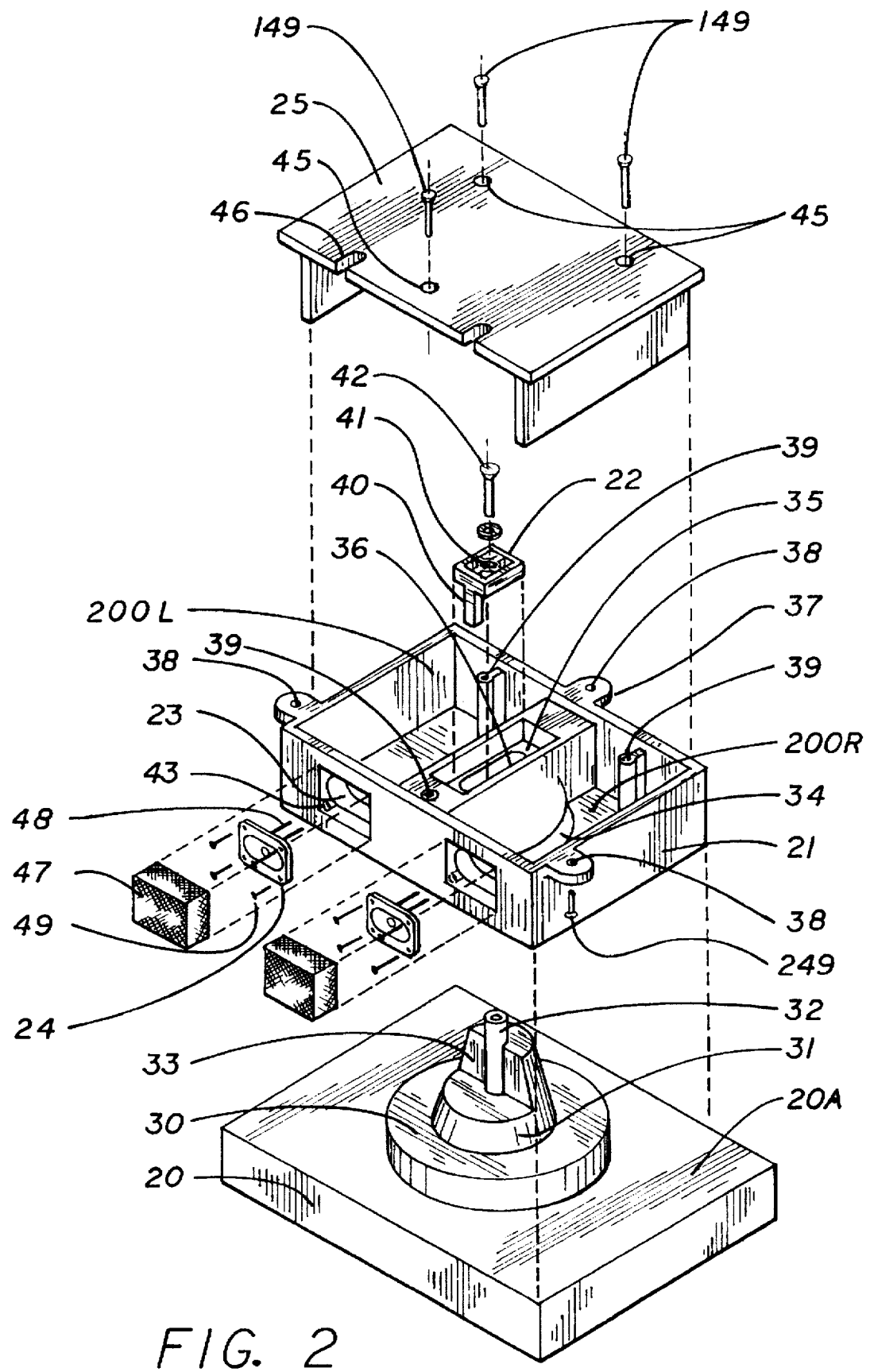
FIG. 2 is a exploded perspective view showing a monitor support structure in accordance with the present invention.

The construction of the present invention for achieving the above objects will be explained with reference to FIGS. 2 and 3 of the attached drawings.

The monitor support in accordance with the present invention comprises a base 20A; a monitor supporting part 21 coupled on the base 20A to be rotatable in upward, downward, left and right directions, a side of the monitor supporting part formed with two speaker fixing portions 23; a connector 22 connecting the base and the monitor supporting part 21 so that the monitor supporting part can be rotated; and a shield 25 for sealing the upper portion of the monitor.

In the above construction, the base 20A comprises a base plate 20; a slip surface 30 formed on the base plate 20 in a circular shape to be contacted with a lower slip surface formed on the monitor supporting part 21; a conical projection 31 upwardly projected from the slip surface 30 to a predetermined height; a boss 32 formed at the center point of the conical projection and projected therefrom to a predetermined height; and a stopper 33 formed around half of the conical projection when the conical projection is imaginarily divided into two halves in reference to the central axis thereof, all of the above constituent elements being integrated as a single body.

Herein, the stopper 33 serves to prevent the monitor supporting part 21 from being rotated beyond a predetermined range.

Additionally, the monitor supporting part 21 comprise a lower slip surface formed on the lower surface of the monitor supporting part 34 and contacted with the slip surface 30 when connected to the base 20A; a upper slip surface 35 formed on a predetermined height from the lower slip surface 34 and contacted with the top surface of the conical projection 31 when connected to the base 20A; a slip hole 36 formed at the center of the upper slip surface, so that the boss 32 projected from the base 20A can be inserted through the slip hole 36; a plurality of monitor fixing lugs 37 formed on the upper external surface of the monitor supporting part 21, each of the lugs being formed with a central fixing hole 38; and a plurality of shield fixing bosses 39 formed internally of the peripheral surfaces of the monitor supporting part 21, all of the above constituent elements being integrated as a single body.

The connector 22 consists of a stopper projection 40 projected from the bottom surface of the connector 22, a connecting hole 41 formed at the center of the connector, and a screw tying the monitor supporting part 21 and the base 20A. The speaker fixing portions consists of a plurality of bosses 43 for fixing the speakers 24 and mesh chassis heat-fusion-welding portions (not visible in the drawing Figures) formed around the peripheral surfaces of the boss 43.

The shield 25 comprises a plurality of connecting holes 45 formed on predetermined positions, i.e., positions corresponding to the shield fixing bosses 39 and slots 46 for receiving lead wires 48 of the speakers. The reference numeral 47 indicates mesh chassis for protecting the speakers 24 and the reference numeral 49 indicates screws (only one of which is seen in FIG. 2) used for tying the constituent elements.

The monitor support in accordance of the present invention is assembled in the following manner.

Firstly, the monitor supporting part 21 is positioned on the base 20A so that the boss 32 formed on the base can be inserted into the slip hole 36 formed on the central portion of the monitor supporting part 21. Thereafter, the connector 22 is positioned so that the connecting hole 41 of the connector 22 is aligned to the boss 32 of the base 20A projected from the slip hole 36 of the monitor slip hole 36, and then the screw 42 is inserted through the connecting hole 41 and fastened to engage the connector 22, the monitor supporting part 21 and the base 20A with each other.

In the structure as assembled in the above manner, the slip surface 30 raised from the upper surface of the base 20A is contacted with the lower slip surface 34 formed on the bottom side of the monitor supporting part 21, and the upper slip surface 35 of the monitor supporting surface is contacted with the top portion of the conical projection 31 formed on the base 20A, whereby the monitor supporting part can be rotated on the base 20A. However, the monitor supporting part cannot be rotated beyond the predetermined extent of angle since the stopper 33 on the base 20A is engaged with the projection 40 projected from the bottom surface of the connector 22 connected to the boss 32 of the base 20A.

In order to fix the speakers to speaker fixing portions 2–3 formed on left and right sides of one side surface of the monitor supporting part 21 rotatably connected on the base 20A as explained in the above, bosses 43 formed on the speaker fixing portion 23 are aligned with holes of speakers, and then a screw 49 is inserted into each of holes and fastened to fix the speakers to the speaker fixing portions 23. And, mesh chassis 47 covers the speakers 24 to protect the speakers 24 from external impacts, the chassis being welded to the heat-fusion-welding portions 44 formed on the peripheral surface of the speaker fixing portions.

When the process for fixing the speakers to the speaker fixing portions as explained in the above has been completed, the connecting holes 45 in the shield 25 and the shield fixing bosses 39 are aligned with each other and then the shield is fixed to the monitor supporting part 21 by the screws 149 inserted into each hole 45 and fastened, whereby the internal space (indicated with numerals 200L and 200K on FIG. 2) of the monitor supporting part 21 is sealed by the shield. As is seen in FIG. 2, the internal space of the monitor supporting part 21 provides acoustic reflex cavities 200L and 200R, respectively communicating individually with each of the speakers 24. These cavities are substantially sealed shut by the shield 25, which also provides acoustical shielding for the monitor 26 from the sound produced by these speakers. Thereafter, the monitor 26 is positioned on the monitor supporting part by inserting the screws 249 (only one of which is seen in each of FIGS. 2 and 3) into the fixing holes 38 centrally formed on each of lugs 37 and fastening them, thereby completing the assembly of the monitor support with integrated speakers.

Figure 3:
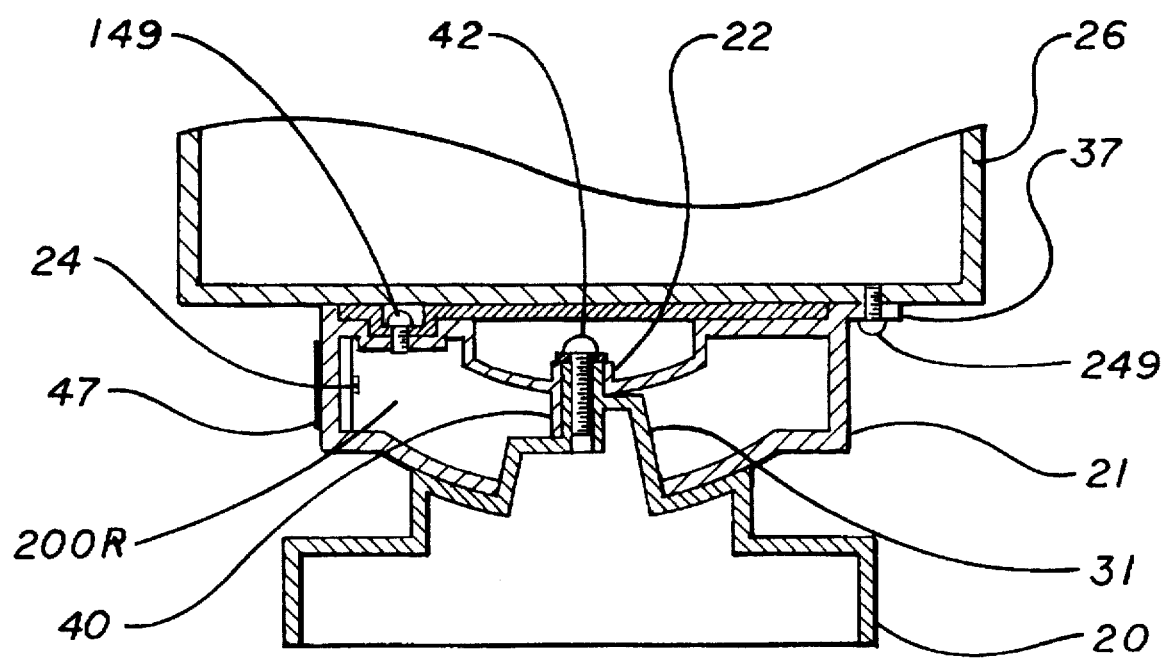
FIG. 3 is a partial vertical section view showing the monitor support structure in the assembled state.
Figure 4:
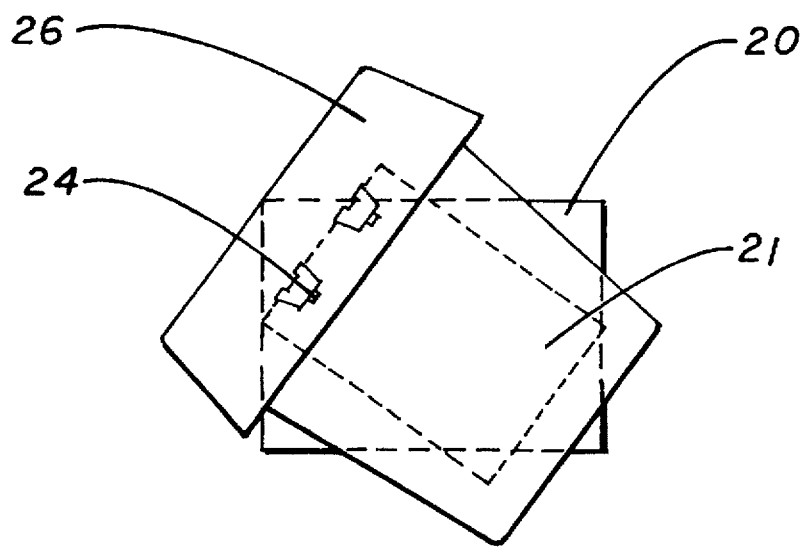
FIG. 4 is a top plan view showing the monitor support structure in a state that the monitor support has been rotated an angle.

FIG. 3 is a partial section view showing the completely assembled monitor support in accordance with the present invention.

Referring to FIG. 3, since speaker lead wire receiving slots 46 are formed at one side of the shield, i.e., the side facing the speaker fixing portion 23, the lead wires 48 extended from the speakers 24 fixed to the speaker fixing portions can be extracted through the slots 46 and connected to the internal circuits of the monitor 26.

Since the speakers 24 are mounted within the monitor supporting part sealed by the shield 25 as explained in the above and the shield absorbs sound pressures generated from the speakers, the sound pressures cannot be transferred to the cathode-ray tube and the howling phenomena are not produced in the monitor even though large volume speakers with high outputs are used. Sound output directions of the speakers 24 and the monitor 26 are always aligned with each other, since when the monitor is rotated an angle, the speakers 24 fixed to the monitor supporting part 21 follow the rotation of the monitor 26.

As explained in the above, the monitor support of the present invention can comprise speakers within the monitor supporting part which rotatably supports the monitor and also can prevent the howling phenomena produced in the monitor since the shield prevents the sound pressures generated from the speakers from being transferred to the monitor.

What is claimed is:

1. A monitor support comprising:

a base;

a monitor supporting part connected on the base to be rotatable in upward, downward, left and right directions, a side of the monitor supporting part being formed with a plurality of speaker fixing portions, said monitor supporting part defining an upwardly opening recess acoustically communicating with at least one of said speaker fixing portions, said monitor supporting part further including:

a lower slip surface formed on a lower surface of the monitor supporting part and contacted with a slip surface of the base when the monitor supporting part is connected to the base;

an upper slip surface formed at a predetermined height from said lower slip surface and contacted with a top surface of a conical projection from said base;

a slip hole formed at a center of said upper slip surface so that a boss projected from said base can be inserted through the slip hole;

a plurality of monitor fixing lugs formed on upper external surfaces of the monitor supporting part; and a plurality of shield fixing bosses formed internally of peripheral surfaces of the monitor supporting part;

a connector for connecting the base and the monitor supporting part so that the monitor supporting part can be rotated; and an acoustical shield for both substantially sealing an upper portion of the monitor supporting part to close said upwardly opening recess so as to bound an acoustical cavity therein which communicates with said at least one speaker fixing portion, and to provide acoustical shielding to a monitor placed upon said monitor supporting part.

2. A monitor support comprising:

a base;

a monitor supporting part connected on the base to be rotatable in upward, downward, left and right directions, a side of the monitor supporting part being formed with a plurality of speaker fixing portions, said monitor supporting part defining an upwardly opening recess acoustically communicating with at least one of said speaker fixing portions;

a connector for connecting the base and the monitor supporting part so that the monitor supporting part can be rotated; and an acoustical shield for both substantially sealing an upper portion of the monitor supporting part to close said upwardly opening recess so as to bound an acoustical cavity therein which communicates with said at least one speaker fixing portion, and to provide acoustical shielding to a monitor placed upon said monitor supporting part, said acoustical shield further including a plurality of connecting holes formed to be connected with shield fixing bosses defined by said monitor support part, and a plurality of slots for receiving lead wires of speakers.

* * * * *